US006313908B1

(12) United States Patent
McGill et al.

(10) Patent No.: US 6,313,908 B1
(45) Date of Patent: Nov. 6, 2001

(54) APPARATUS AND METHOD USING A HOLOGRAPHIC OPTICAL ELEMENT FOR CONVERTING A SPECTRAL DISTRIBUTION TO IMAGE POINTS

(75) Inventors: Matthew J. McGill, Severn; Vibart S. Scott, Owings Mills; Marzouk Marzouk, Annapolis, all of MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/346,698

(22) Filed: Jul. 2, 1999

Related U.S. Application Data

(60) Provisional application No. 60/091,733, filed on Jul. 2, 1998.

(51) Int. Cl.[7] ................. G01P 3/36; G01J 3/45; G01B 9/021
(52) U.S. Cl. .............. 356/28.5; 356/346; 356/347
(58) Field of Search ................. 356/4.03, 5.09, 356/4.09, 346, 347, 28.5

(56) References Cited

U.S. PATENT DOCUMENTS

| | | |
|---|---|---|
| 3,779,492 | 12/1973 | Grumet . |
| 4,519,670 | 5/1985 | Spinner et al. . |
| 4,605,314 * | 8/1986 | Stenmark ............... 374/127 |
| 4,893,003 | 1/1990 | Hays . |
| 5,009,502 * | 4/1991 | Shih et al. . |
| 5,129,041 | 7/1992 | Pernick et al. . |
| 5,159,406 * | 10/1992 | Adler ..................... 356/349 |
| 5,239,352 | 8/1993 | Bissonnette . |
| 5,255,065 | 10/1993 | Schwemmer . |
| 5,796,471 | 8/1998 | Wilkerson et al. . |

FOREIGN PATENT DOCUMENTS

| | | |
|---|---|---|
| 419029 | 3/1991 | (EP) . |
| 62028704 | 2/1986 | (JP) . |

OTHER PUBLICATIONS

"Holographic Detection System for Use with Fabry–Perot Interferometers and Particular Applications for Lidar Work," 4 pages, Feb. 12, 1997; (see declaration).

"Image Plane Detector for the Dynamics Explorer Fabry–Perot Interferometer," Timothy L. Killeen, B.C. Kennedy, P.B. Hays, D.A. Symanow, and D. H. Ceckowski, *Applied Optice*, vol. 22, No. 22, Nov. 15, 1983, pp. 3503–3513.

"Circle to line interferometer optical system," Paul B. Hays, *Applied Optics*, vol. 29, No. 10, Apr. 1, 1990, pp. 1482–1489.

"Holographically Generated Lens," Andreas K. Richter and F. Paul Carlson, *Applied Optics*, vol. 13, No. 12, Dec., 1974, pp. 2924–2930.

(List continued on next page.)

Primary Examiner—Stephen C. Buczinski

(57) ABSTRACT

A holographic optical element transforms a spectral distribution of light to image points. The element comprises areas, each of which acts as a separate lens to image the light incident in its area to an image point. Each area contains the recorded hologram of a point source object. The image points can be made to lie in a line in the same focal plane so as to align with a linear array detector. A version of the element has been developed that has concentric equal areas to match the circular fringe pattern of a Fabry-Perot interferometer. The element has high transmission efficiency, and when coupled with high quantum efficiency solid state detectors, provides an efficient photon-collecting detection system. The element may be used as part of the detection system in a direct detection Doppler lidar system or multiple field of view lidar system.

12 Claims, 11 Drawing Sheets

OTHER PUBLICATIONS

"Designing and constructing thick holographic optical elements," W.C. Sweatt, *Applied Optics*, vol. 17, No. 8, Apr. 15, 1978, pp. 1220–1227.

"Design of a holographic lens for the infrared," Chen, Hershey and Leith, *Applied Optics*, vol. 26, No. 10, May 15, 1987, pp. 1983–1988.

"Control of DCG and non silver holographic materials," Richard D. Rallison, SPIE vol. 1600 *International Symposium on Display Holography*, 1991, pp. 26–37.

"Wavelength Compensation by Time Reverse Ray Tracing," Richard D. Rallison, Scott R. Schicker, SPIE vol. 2404, Mar. 1995, pp. 217–226.

"Wavelength compensation at $1.064\mu$ using hybrid optics," Richard D. Rallison, SPIE vol. 2689, 8/96, pp. 267–273.

"The High–Resolution Doppler Imager on the Upper Atmosphere Research Satellite," Paul B. Hays, Vincent J. Abreu, Michael E, Dobbs, David A. Gell, Heinz J. Grassel, and Wilbert R. Skinner, *Journal of Geophysical Research*, vol. 98, No. D6, Jun. 20, 1993, pp. 10713–10723.

"Proton counting techniques with silicon avalanche photodiodes," Dautet, Dion, MacGregor, MacSween, McIntyre, Trottier and Webb, *Applied Optics*, vol. 32, No. 21, Jul. 20, 1993, pp. 3894–3900.

"Observations of winds with an incoherent lidar detector," Vincent J. Abreu, John E. Barnes, and Paul B. Hays, *Applied Optics*, vol. 31, No. 22, Aug. 1, 1992, pp. 4509–4514.

"Visible wavelength Doppler lidar for measurement of wind and aerosol profiles during day and night," Fischer, Abreu, Skinner, Barnes, McGill, and Irgang, *Optical Engineering*, vol. 34, No. 2, Feb. 1995, pp. 499–511.

"Analysis techniques for the recovery of winds and backscatter coefficients from a multiple–channel incoherent Doppler lidar," McGill, Skinner and Irgang, *Applied Optics*, vol. 36, No. 6, Feb. 20, 1997, pp. 1253–1268.

"Image Plane detector for Fabry–Perot interferometers: physical model and improvement with anticoincidence detection," Paul B. Hays, and Jinxue Wang, *Applied Optics*, vol. 30, No. 22, Aug. 1, 1991, pp. 3100–3107.

"Validation of wind profiles measured with incoherent Doppler lidar," McGill, Skinner, and Irgang, *Applied Optics*, vol. 36, No. 9, Mar. 20, 1997, pp. 1928–1939.

"Multiple field of view lidar returns from atmospheric aerosols," Hutt, Bissonnette, and Durand, *Applied Optics*, vol. 33, No. 12, Apr. 20, 1994, pp. 2338–2348.

"Multiple scattering lidar," Bissonnette and Hutt, *Applied Optics*, vol. 29, No. 34, Dec. 1, 1990, pp. 5045–5046.

"Multiscattered lidar returns from atmospheric aerosols," SPIE vol. 1487 *Propagation Engineering: Fourth in a Series*, 1991, pp. 250–261.

"DOEs improve lidar system performance," P. Galarneau, B. Tadic–Galeb, P. Bernard, R. Pawluczyk and B. Leclerc, published in "Optical Remote Sensing for Environmental and Process Monitoring," Air & Waste Management Association, San Francisco, Sep. 25–27, 1995, pp. 217–223.

NOI Bulletin, vol. 5, No. 2, Jul. 1994, published by the National Optics Institute, Quebec, Canada.

"The diversity of fiber optic rotary connectors (slip rings)," J. Alexander Speer and Walter W. Koch, SPIE vol. 839 *Components for Fiber Optic Applications II*, 1987, pp. 122–129.

\* cited by examiner

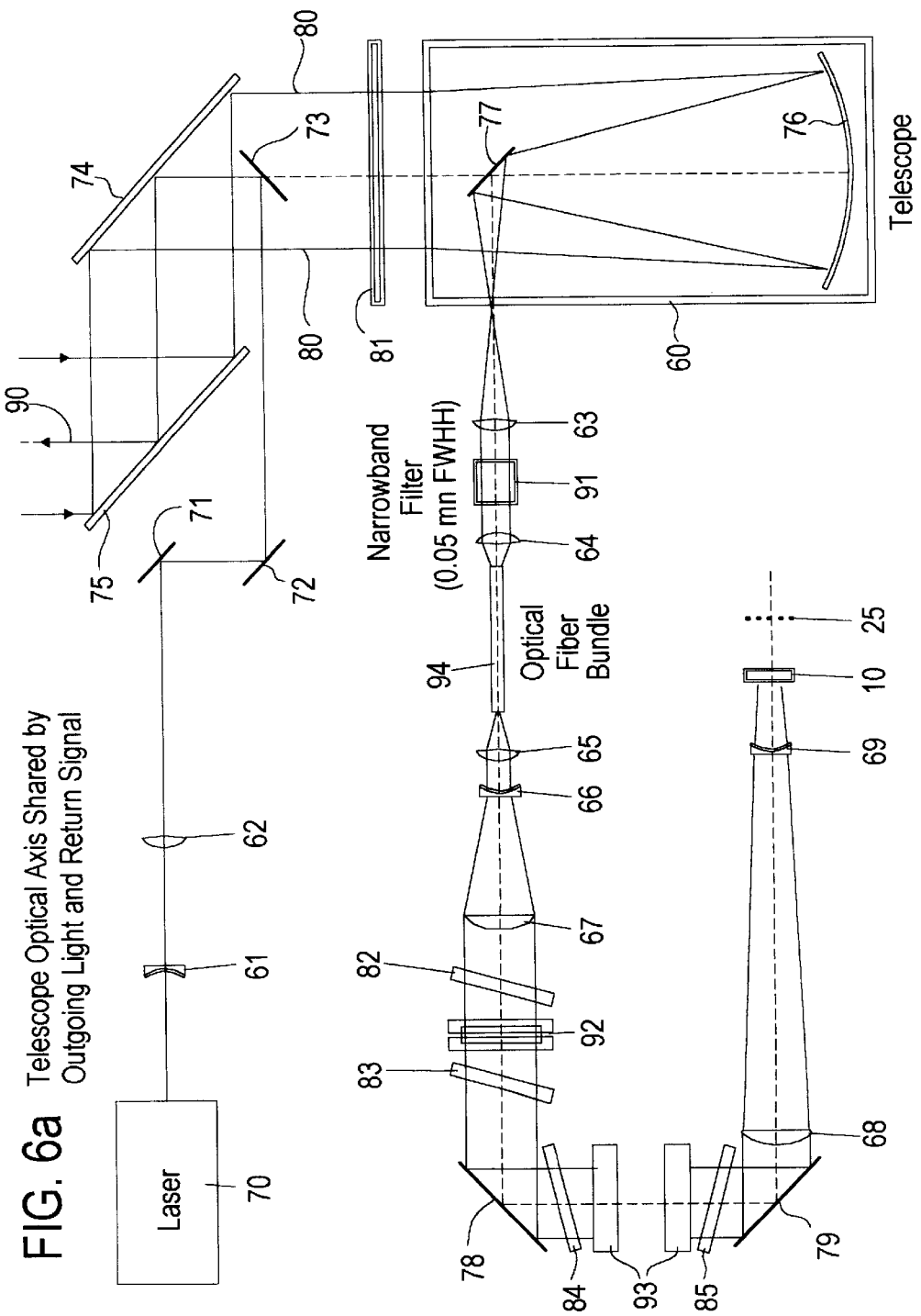
FIG. 6a  Telescope Optical Axis Shared by Outgoing Light and Return Signal

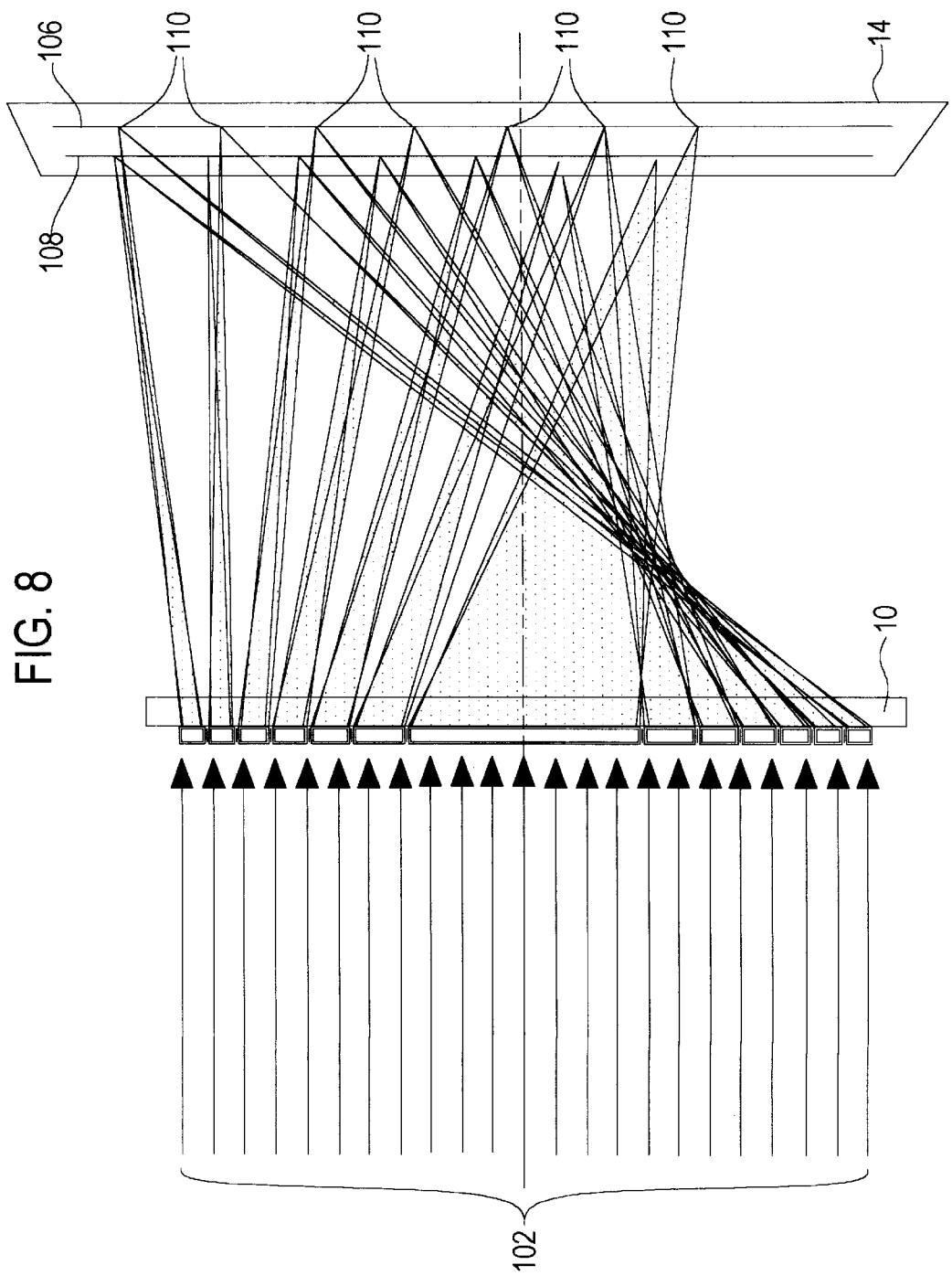

APPARATUS AND METHOD USING A HOLOGRAPHIC OPTICAL ELEMENT FOR CONVERTING A SPECTRAL DISTRIBUTION TO IMAGE POINTS

CROSS-REFERENCE TO RELATED APPLICATIONS

This application claims the benefit of priority under 35 U.S.C. §119(e) of U.S. Provisional patent application No. 60/091,733 filed Jul. 2, 1998, entitled "Holographic Optical Element Apparatus, Article of Manufacture, and Method for Converting Incident Electromagnetic Radiation Distribution to Points," which is hereby incorporated by reference.

GOVERNMENT RIGHTS

The invention described herein was made in the performance of work under a NASA contract and by employees of the United States Government and is subject to the provisions of Section 305 of the National Aeronautics and Space Act of 1958, Public Law 85-568 (72 Stat. 435; 42 U.S.C. 2457, as amended), and may be manufactured and used by or for the Government for governmental purposes without the payment of any royalty thereon or therefor.

BACKGROUND

Field of the Invention

The field of the invention is the use of holographic optical elements to convert the information of a spectral distribution of light to another form. For convenience, the term "light" will be used to mean electromagnetic radiation of any and all wavelengths.

Many applications require discrimination or selection of wavelengths, but with different resolution requirements. For example a prism can be used as a low resolution spectrometer to separate visible light into its constituent colors. However other applications require isolation of narrow spectral lines to resolve a spectral shape.

One such application is a lidar system to measure wind velocities by aerosol and/or molecular backscatter. In a direct, detection Doppler lidar or incoherent lidar, the Doppler shift resulting in a pulse of narrowband laser light from scattering by aerosols or molecules is measured. A zero-wind reference spectrum of an outgoing laser beam is measured by the collection of light scattered from the outgoing optics. The reference spectrum and a backscattered laser light return signal pass through receiving optics. The reference spectrum is subtracted from the return signal to determine the Doppler shift. A high resolution spectroscopic device, typically a Fabry-Perot interferometer is used to detect the wavelength shifts.

The Fabry-Perot interferometer produces a circular interference spectrum or fringe pattern of equal area rings representing equal wavelength intervals, sharing a common axis, at the infinity focus of an objective lens system. Different types of image plane detectors have been created which attempt to match the circular pattern. Converting the pattern itself to fit linear detectors has also been accomplished.

One such image plane detector is described in "Image plane detector for the Dynamics Explorer Fabry-Perot interferometer," Timothy L. Killeen, B. C. Kennedy, P. B. Hays, D. A. Symanow, and D. H. Ceckowski, *Applied Optics*, Vol. 22, No. 22, Nov. 15, 1983, pp. 3503–3513. This device consisted of an S-20 photocathode, three microchannel plate electron multiplication stages, and an equal-area concentric-ring segmented anode to match the interference ring pattern. Another type of image plane detector was a multi-element detector of concentric rings of PIN photodiode material. (See U.S. Pat. No. 5,239,352 "Multiple Scattering Technique (MUST) Lidar," Luc R. Bissonnette, Issue Date Aug. 24, 1993 and "Multiple field of view lidar returns from atmospheric aerosols," D. L. Hutt, L. R. Bissonnette, and L. Durand, *Applied Optics*, Vol. 33, No. 12, Apr. 20, 1994, 2338–2348. The image plane detectors typically suffer from blurring of spot sizes and low quantum efficiency.

A different approach for converting the information in a Fabry-Perot fringe pattern to a more easily detectable form is described in U.S. Pat. No. 4,893,003, "Circle-to-Line Interferometer Optical System," Paul B. Hays, Issue Date: Jan. 9, 1990 and "Circle to line interferometer optical system," Paul B. Hays, *Applied Optics*, Vol. 29, No. 10, Apr. 10, 1990, 1482–1489. A 45 degree half angle internally reflecting cone segment is used to convert the circular Fabry-Perot interferometer fringe pattern into a linear pattern.

A small, high efficiency, compact, low cost device for obtaining the most information in a Fabry-Perot pattern while being compatible with linear arrays of detectors is desired. Being able to couple the pattern to solid state photodetectors as opposed to charge coupled device (CCD) detectors has the benefit of no cooling requirements when measuring atmospheric wind profiles. Also, solid state photodetectors can resolve the wavelength phase shift in the microsecond time interval needed for range resolved lidar measurements. In addition, a lidar system with multiple fields of view or, in other words, a very wide field of view is desired to avoid or lessen movement of the optical system in order to change zenith angle.

SUMMARY

A small, compact holographic optical element (HOE) with high transmission efficiency has been developed which may be used in an apparatus for resolving a spectral distribution of light. The holographic optical element of the present invention converts an incident spectral distribution to image points. The element comprises areas, each comprising a recorded hologram of a point source. Each area acts as a separate lens to focus the distribution in its area to an image point. Each of the image points is angularly separated from the others.

The image points can form a line and lie in the same focal or image plane which is convenient for use with a linear array detector.

The areas can be made in various geometries. For example, one embodiment of the element has concentric equal areas sharing a common axis to match the equal wavelength intervals in the circular fringe pattern of a Fabry-Perot interferometer. The Fabry-Perot pattern is focussed onto the HOE which in turn focuses the light on each concentric area or annulus to an image point. Detectors, such as analog detectors, charge coupled devices (CCD) or solid state photodetectors can then be used to measure the intensities of the image points.

All the areas of the HOE focus about the same wavelength. Another version of the HOE has additional recorded holograms overlaid for additional wavelengths so that this version of the element can focus light of different wavelengths to separate series' of points. For example, each area may be overlaid with holograms for wavelengths in the red and green portions of the visible spectrum. The result would be a series of image points for the red wavelength and a series of points for the green wavelength.

The holographic optical element and at least one detector can be integrated as the detection system in a incoherent or direct detection Doppler lidar system. Furthermore, a multiple field of view lidar system for measuring multiple scattering of an outgoing laser beam may have receiving optics comprising an embodiment of the holographic optical element placed at the focal plane of a wide angle telescope.

BRIEF DESCRIPTION OF THE DRAWINGS

FIG. 4b shows a side view of an embodiment of FIG. 4a.

FIG. 6a shows the integration of the holographic optical element in an example of a direct-detection Doppler lidar system.

FIG. 8 illustrates a holographic optical element focusing light of two different wavelengths into two corresponding series of points, each series of points forming its own line, the two lines lying in the same image plane.

DETAILED DESCRIPTION

Figure 1A:
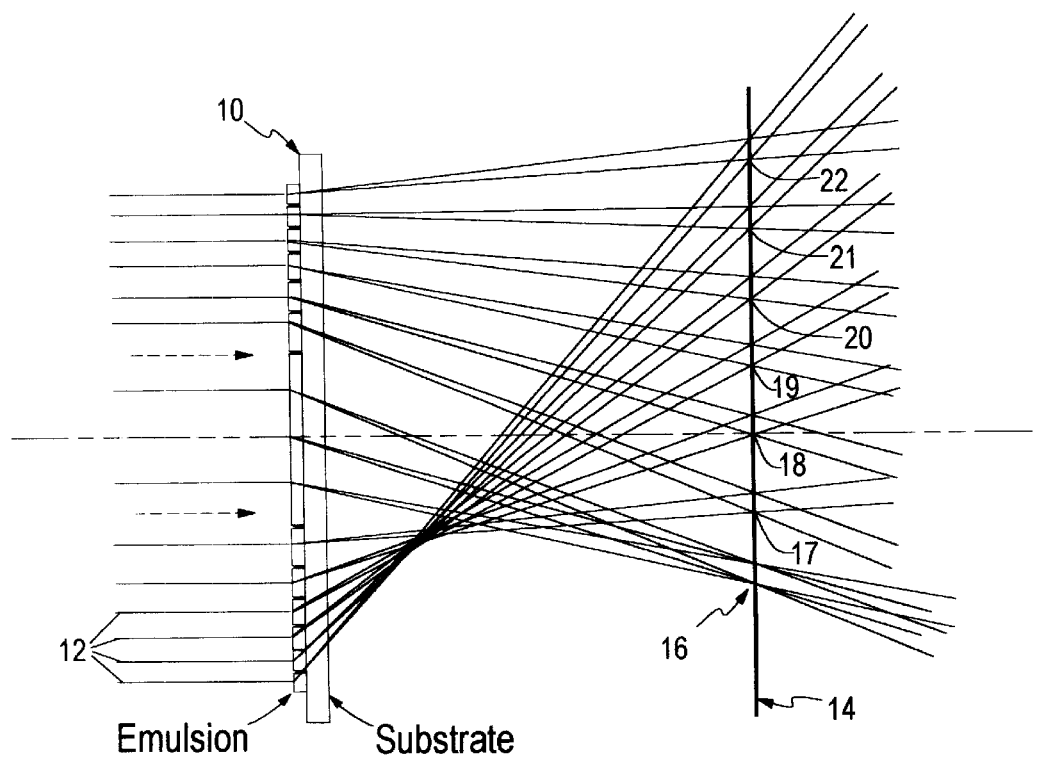
FIG. 1a is a ray trace diagram illustrating the behavior of the holographic optical element of the present invention.
Figure 1B:
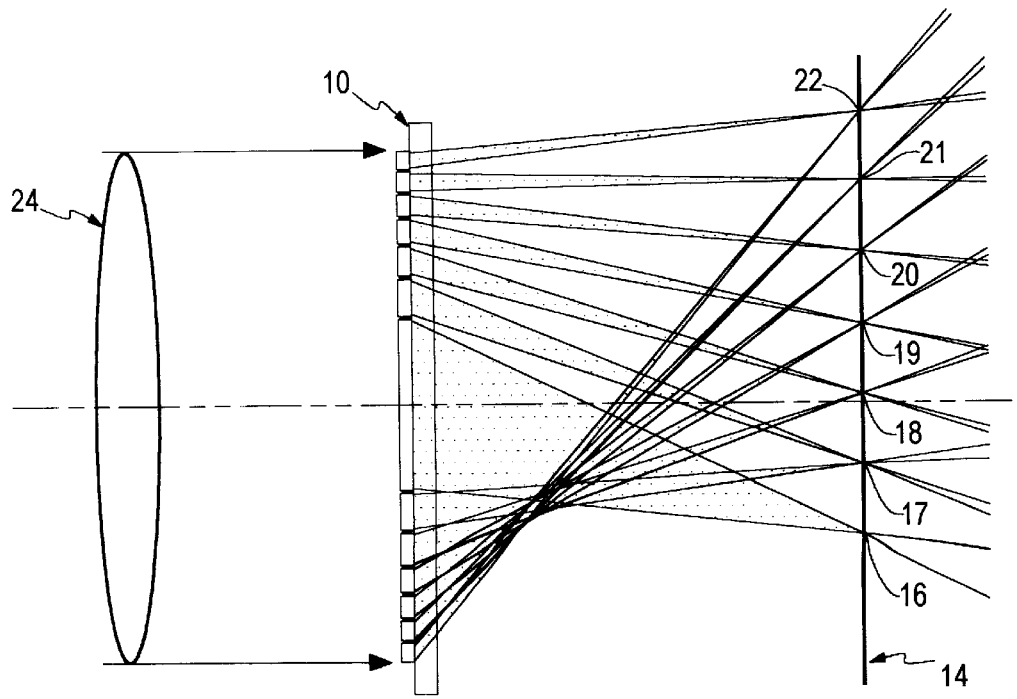
FIG. 1b shows the overall behavior of the holographic optical element as a light-integrating optic.

The present invention comprises a holographic optical element (HOE) that converts a spectral distribution of light to a series of image points, each point being the focus of light incident on a particular area of the element. FIG. 1a illustrates the imaging properties of the HOE (10) in a ray trace diagram. In this embodiment, the HOE is a plate comprising concentric areas or annuli. The incident light (12) passing through the element diverges, but there is an image or focal plane (14) where rays from each area or annulus overlap to form a localized image. In other words, the rays for a particular area on the element overlap to form an image point (i.e. 16). From all the areas, a series of image points are created (16–22). FIG. 1b shows an incident plane wave (24) being focussed on the HOE (10). FIG. 1b shows that the overall behavior of this element (10) is to redirect all the incident light of an area or annulus to an image point. Each area acts as a separate lens. In other words, a spectral distribution of light is passed through the areas of the holographic optical element. Each of these areas focuses the distribution incident on its area to an image point which is angularly separated from the image points of the other areas. One or more detectors may be placed or optically coupled at the image points to measure the intensity distribution at them.

Figure 2A:
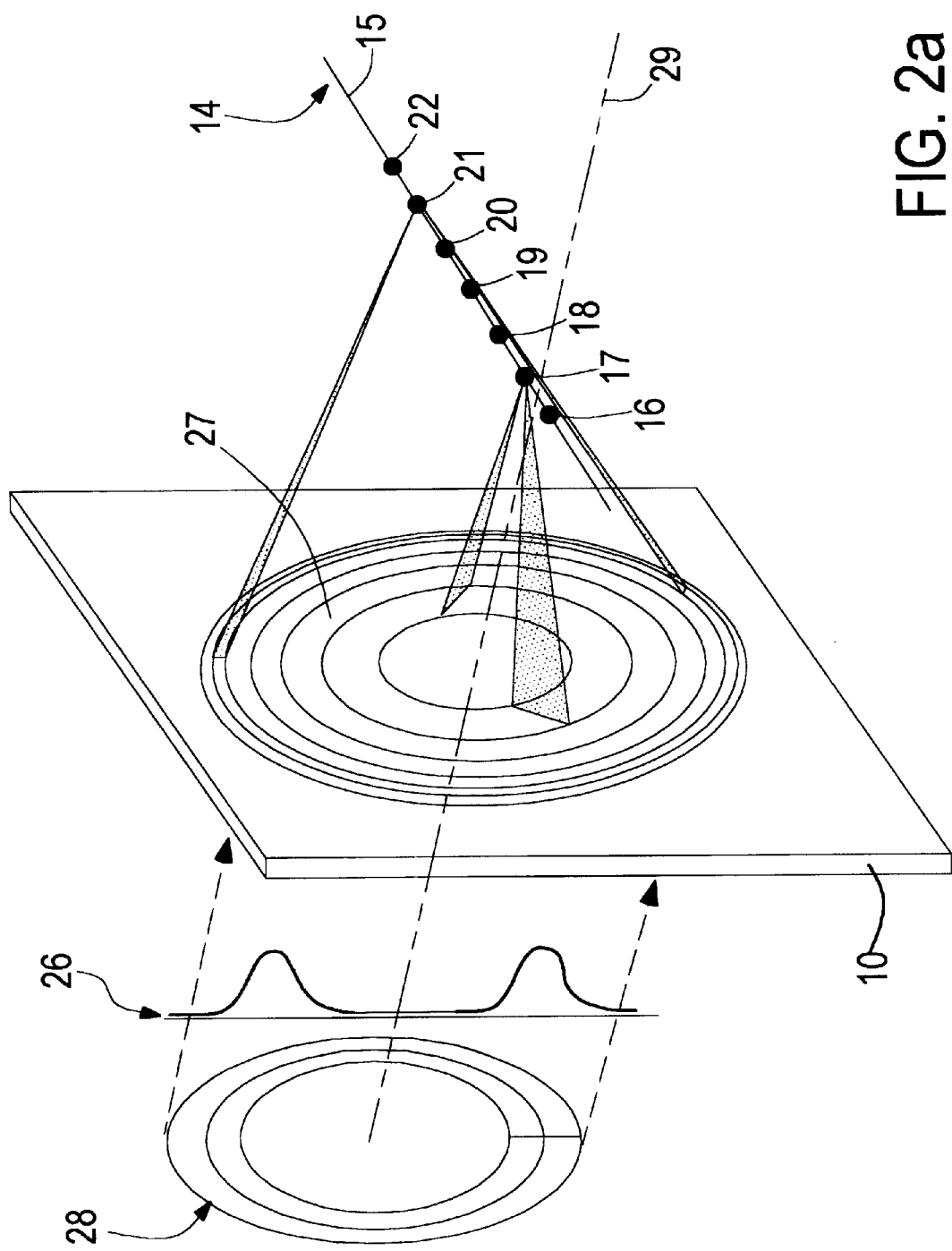
FIG. 2a shows a holographic optical element focussing the incident intensity distribution to image points in the same line in an image plane.
Figure 2B:
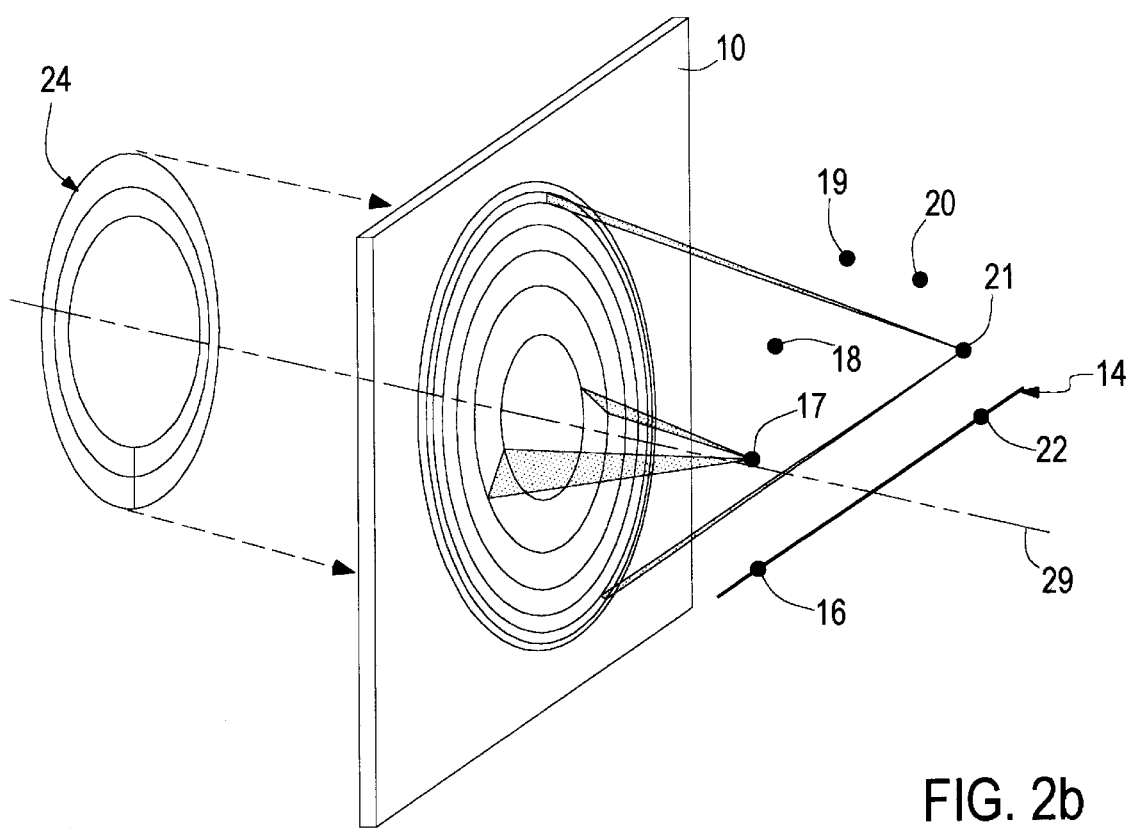
FIG. 2b shows an embodiment of the element in which the series of points forms an arc in the same focal plane.

FIGS. 2a and 2b illustrate embodiments of the holographic element comprising a plate of equal concentric areas sharing a common axis. In FIG. 2a, shows the areas such as (27), converting a Fabry-Perot interferometer circular fringe pattern (28) to a line of points off the common axis (29). This is particularly convenient for use with a linear array of detectors. FIG. 2b shows the image points lying in an arc in the focal plane (14). The present invention may be embodied in patterns of any geometric shape to measure a desired spectral distribution. The embodiment shown here is particularly useful for measuring the Fabry-Perot fringe pattern because the equal areas represent the equal wavelength intervals of this fringe pattern. However, another distribution may require unequal areas. For example, if measuring the energy of a spectral distribution, a pattern of concentric areas with the outer area being significantly larger in proportion than those of the inner areas may be used (not shown). The resultant points would represent the intensity of equal energy distribution in that the larger outer area represents the same energy content as one of the smaller inner concentric areas. A multiple-field-of-view lidar is another example that may use an embodiment of the element with unequal areas.

Figure 3A:
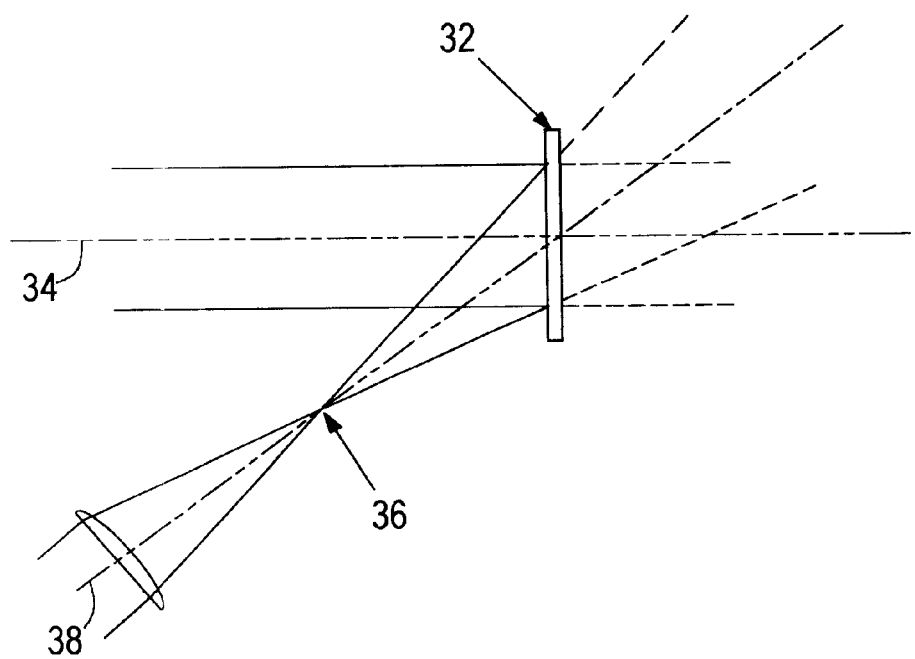
FIG. 3a illustrates the first step in the process of spatial multiplexing of recording a master hologram of a reference beam and the object beam of a point source.
Figure 3B:
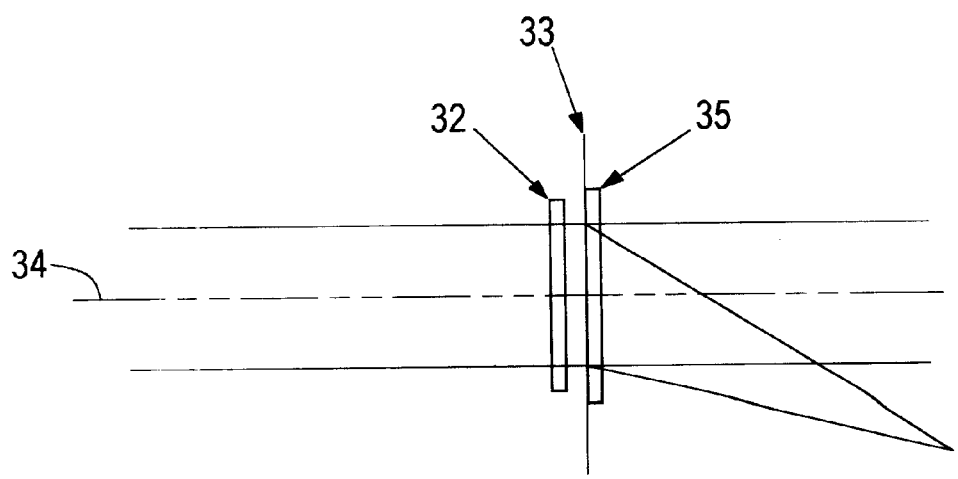
FIG. 3b shows the next step in the process of spatial multiplexing of individually exposing copy film on each area of the HOE to the master hologram while the other areas are masked. The master hologram is then translated between exposures.

FIGS. 3a and 3b show the steps in the spatial multiplexing process to generate the holographic optical element shown in FIG. 2a. A master hologram (32) is recorded in a dichromated gelatin (DCG) emulsion (35) on a glass substrate with a reference beam (34) and the object beam (38) of a point source object (36). The HOE comprises a dichromated gelatin (DCG) (35) on a glass substrate. FIG. 3b shows that each area was then exposed individually to the master hologram (32) while the other areas were masked (33). The element was translated between these individual exposures so that the points would fall in a line of points off the common axis. Afterwards, antireflection coatings were applied to the plates. For the embodiment shown in FIG. 2b, the hologram was recorded at 488 nm for use at 532 nm. Seven annuli were chosen because that was the number of photodetectors available. The more annuli, the greater the resolution would be for imaging a spectral distribution. The dimensions of an embodiment of an HOE as shown in FIG. 2b are given in Table 1.

TABLE 1

| Annulus | Inner Radius (mm) | Outer Radius (mm) | Transmission Efficiency |
| --- | --- | --- | --- |
| 1 | 0.0 | 14.400 | 69.7% |
| 2 | 14.400 | 20.365 | 68.6% |
| 3 | 20.365 | 24.942 | 65.7% |
| 4 | 24.942 | 28.801 | 59.8% |
| 5 | 28.801 | 32.200 | 58.9% |
| 6 | 32.200 | 35.274 | 58.0% |
| 7 | 35.274 | 38.100 | — |

To measure the transmission efficiency, the plate was mounted in a collimator with a 532 nm light source, and the energy in each image was measured. A large lens replaced the element. The lens was masked with a series of annular overlays to replicate the dimensions of the areas of the element. The energy was measured for comparison. For the particular embodiment, the outermost annulus was not measured due to masking of the element. The transmission efficiency ranged from 58% to 70%. Light not collected into the image points appears in several locations. Some is transmitted directly through the plate (zero order), some is sent into a negative order, and some is reflected. For this particular HOE plate, the zero order was found to contain about 12% of the incident light. The HOE substrate loss was measured to be about 4%. The negative order could not be collected and measured but appears to contain less than 10% of the incident light.

A smaller embodiment of the element for a wavelength of 532 nm was also made, and its image points form a line as shown in FIG. 2a. The overall plate size was one inch diameter to mount in a standard one inch optic mount. This embodiment has a one-half inch diameter or 12.7 mm active area of seven areas or annuli. Again, the areas in this embodiment are about equal match a Fabry-Perot fringe pattern. The areas were made to within 5% to account for masking or overlap required to separate the neighboring annuli. The dimensions of this plate are shown in Table 2.

TABLE 2

| Annulus | Inner Radius (mm) | Outer Radius (mm) |
| --- | --- | --- |
| 1 | 0.0 | 2.4001 |
| 2 | 2.4001 | 3.3942 |
| 3 | 3.3942 | 4.1571 |
| 4 | 4.1571 | 4.8001 |
| 5 | 4.8001 | 5.3667 |
| 6 | 5.3667 | 5.8790 |
| 7 | 5.8790 | 6.3500 |

The annuli for this embodiment were made to be concentric to within 0.001 inches off the common center axis. This plate was optimized for use in an unpolarized beam, having 2.5 (half-angle) divergence, for a minimum spot size of 50 um diameter at $1/e^2$ points for a collimated beam and 125 um diameter including all effects such as blur. It demonstrated better than the 25 um diameter spot size with spot sizes of less than 100 um. The transmission efficiency for this plate, measured in the same manner previously described, was nearly 80% for all annuli. For a circular fringe pattern, this embodiment was oriented to be orthogonal to the incident light beam's optical axis to within +/−0.5 degrees. Furthermore, the image or focal plane containing the image points was orthogonal to the optical axis of the incident light beam to within +/−0.5 degrees. The image plane for this plate is located at a focal length of 2.0 inches +/−0.010 inches. The image points were separated by approximately 2 mm center to center so that there was no crosstalk between them. This one inch plate was used in the detection system of FIGS. 4a and 4b.

Figure 4A:
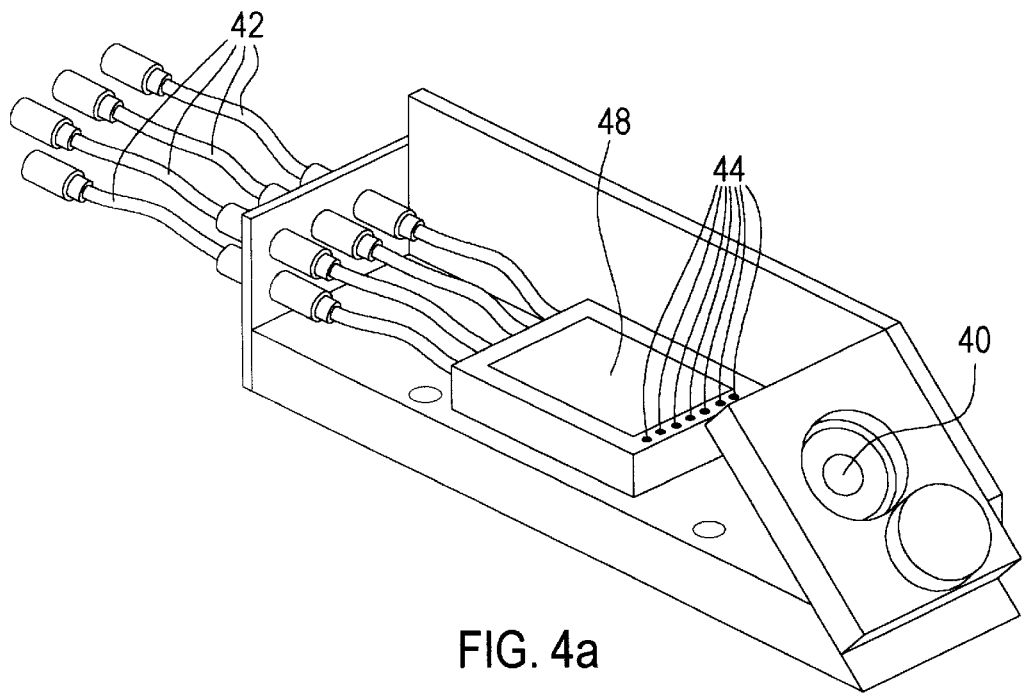
FIG. 4a shows a top view of an embodiment of a detection system in which the holographic optical element was used to convert a circular fringe pattern from a Fabry Perot interferometer to a series of points.
Figure 4B:
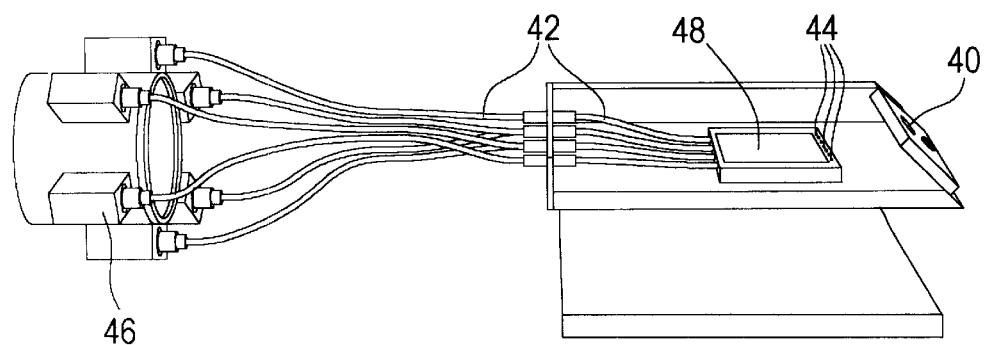

FIG. 4a shows a top view and FIG. 4b shows a side view of a version of a detection system wherein the one inch diameter HOE (40) was used. The HOE focuses incident light of wavelength 532 nm to a series of points (44) that all lie in the same image plane. There is no limitation that the points always lie in the same image plane; however, such coplanar configurations are convenient for use with certain detector arrangements such as linear array detectors. Examples of detectors would be analog detectors, charge-coupled devices (CCDs), and solid state detectors. Bare fibers, epoxied in place (48), and insulated fiber optics (42), optically couple the image points (44), which demonstrated spot sizes smaller than 100 um, to detectors contained in structure (46) shown in the side view of FIG. 4b. The detectors used in this embodiment were solid-state photon counters, specifically EG&G silicon avalanche photodiode detectors, which have the advantage of no cooling requirements as CCD detectors can require. At the 532 nm wavelength, all the areas of this HOE embodiment demonstrated greater than eighty percent (80%) transmission efficiency, contributing to an overall efficiency of 65% as measured by the fiber optically coupled photon counters.

Figure 5:
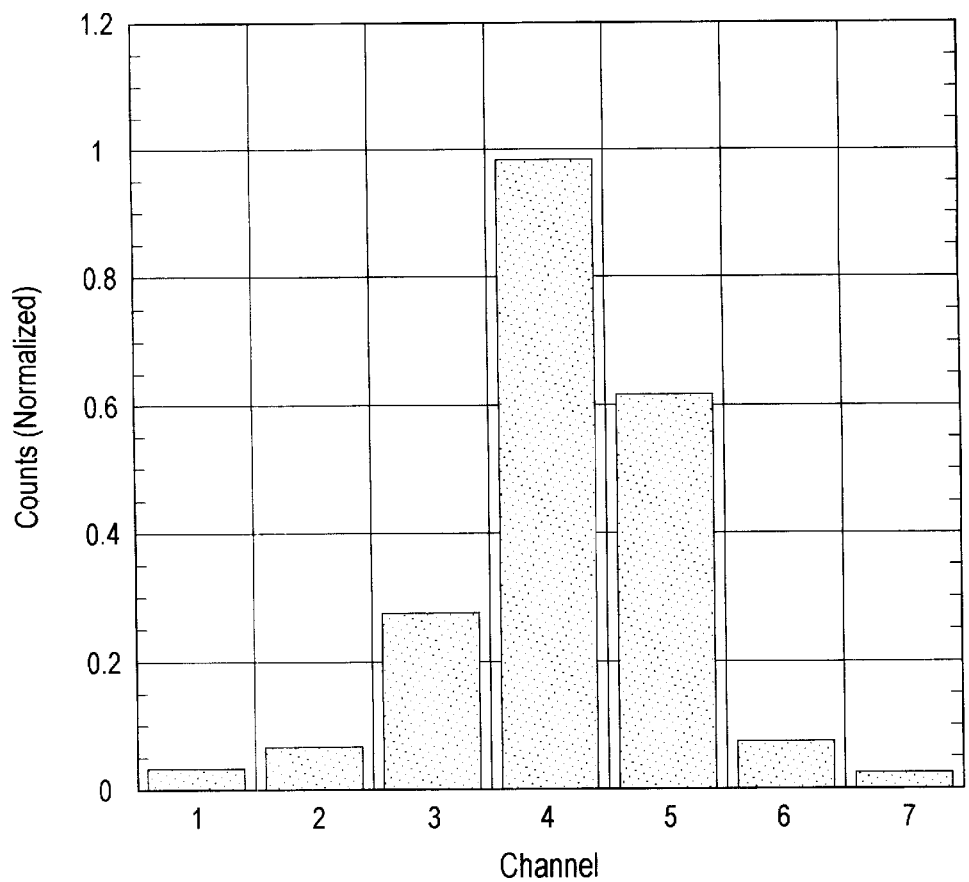
FIG. 5 shows a data plot of normalized photon counter detector data for each concentric area, referred to as a channel in the plot for the detection system shown in FIGS. 4a and 4b.

FIG. 5 shows a plot of normalized photon counter detector data for each concentric area, referred to as a channel in the plot for the detection system shown in FIGS. 4a and 4b. The pattern detected by the photon counters matches that for a Fabry-Perot interferometer, illustrating excellent transmission efficiency.

Figure 6B:
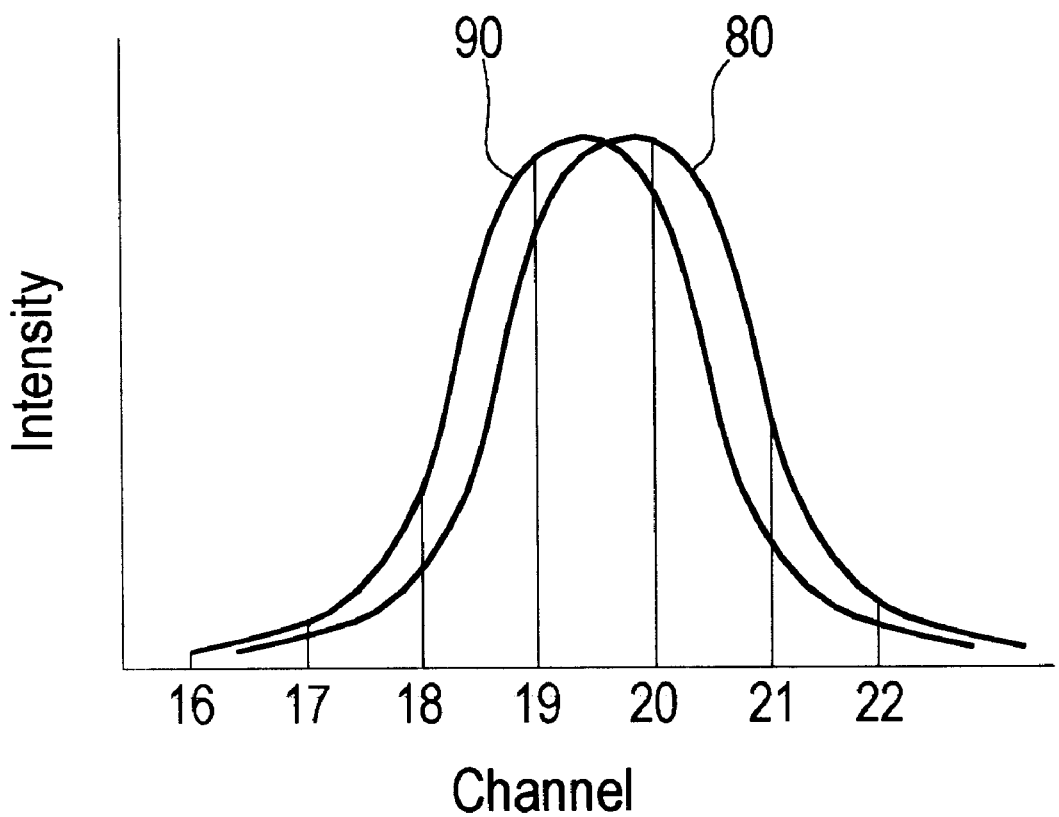
FIG. 6b shows a distribution of intensity versus annuli or areas as would appear for both an outgoing laser beam and a Doppler shifted return signal in a direct detection Doppler lidar system.

FIG. 6a shows an example of a direct-detection Doppler lidar system in which the HOE is used rather than an image plane detector. In general, a lidar system measures wind velocities by measuring the backscatter of an outgoing laser beam by aerosols and/or molecules. A typical direct detection Doppler or incoherent lidar will comprise a laser transmitter that creates an outgoing laser beam. Outgoing optics collect scattered light of the outgoing laser beam to create a zero wind reference spectrum which follows an optical path through receiving optics. The receiving optics receive not only the reference spectrum, but a return signal of the outgoing laser beam that was backscattered. The receiving optics pass the reference spectrum and the return signal through a high resolution spectral resolving element, such as a Fabry-Perot interferometer, thereby creating a spectral distribution that must be detected so that a Doppler shift between the reference spectrum and the return signal is determined. The distribution in FIG. 6a is focused onto the holographic optical element, the element focusing the distribution to image points which are optically coupled to detectors.

The example of the lidar system shown is similar to that described in the publications, "Visible wavelength Doppler lidar for measurement of wind and aerosol profiles during day and night," Kenneth W. Fischer, Vincent J. Abreu, Wilbert R. Skinner, John E. Barnes, Matthew J. McGill, and Todd D. Irgang, *Optical Engineering*, February 1995, Vol. 34, No. 2 499–511, pp. 500–501 and "Analysis techniques for the recovery of winds and backscatter coefficients from a multiple-channel incoherent Doppler lidar," Matthew J. McGill, Wilbert R. Skinner and Todd R. Irgang, *Applied Optics*, Feb. 20, 1997, Vol. 36, No. 6 1253–1268, pp. 1255–1256, except with the significant difference that the holographic element (10) is integrated into the system rather than an image plane detector.

In this embodiment, the laser transmitter (70) creates an outgoing laser beam (90). A pulsed, frequency-doubled Nd:YAG laser can be used with a frequency doubled to 532 nm with a 3.0 W average power and a repetition rate of 50-Hz. To allow for the 140 MHz linewidth necessary to measure the Doppler shift, a frequency controlled cw injection laser (not shown) seeded the Nd:YAG laser. The outgoing laser beam (90) is directed through a telephoto pair of lenses (61) and (62) near the output aperture of the laser so that it has a divergence angle of 0.2 mrad. The outgoing laser beam is aligned with the telescope axis using a system of high-power laser mirrors (71, 72, 73, 74 and 75), which allows full sky coverage. Mirrors (74) and (75) are then used to direct the outgoing beam. A backscattered light return signal (80) is collected by a 44.5-cm-diameter, f/4.5 Newtonian astronomical telescope (60). The field of view of the telescope is 0.5 mrad to collect all the laser light which may fall outside the divergence angle of 0.2 mrad. The collected light is focussed by the telescope onto a collimating lens (63) and passed through a 0.05-nm fall-width-half-height bandwidth solid etalon / interference filter (91) to remove the background light such as sunlight. Then the light is focussed onto a 3.5-mm-diameter optical fiber bundle (94) to create a more uniform distribution of light so as to remove the effects of inhomogenities in the scattering aerosol mass which may cause offsets in the wind velocity measurements. The light is then expanded and recollimated using a telephoto lens pair (65 and 66). It then passes first through a low resolution Fabry-Perot interferometer (92) with 0.49 cm spacing and then through a high resolution Fabry-Perot interferometer (93) with 10 cm spacing. The low resolution etalon acts to attenuate the unwanted extra orders of the high resolution etalon. Telephoto lens pair 68 and 69 focus the interference pattern from the high resolution Fabry-Perot onto the holographic optical element (10) creating a series of point images (25). By comparing the spectral shape of the return signal (80) with that of the outgoing laser beam (90), as in a plot of FIG. 6b, the Doppler shift can be measured.

Figure 7A:
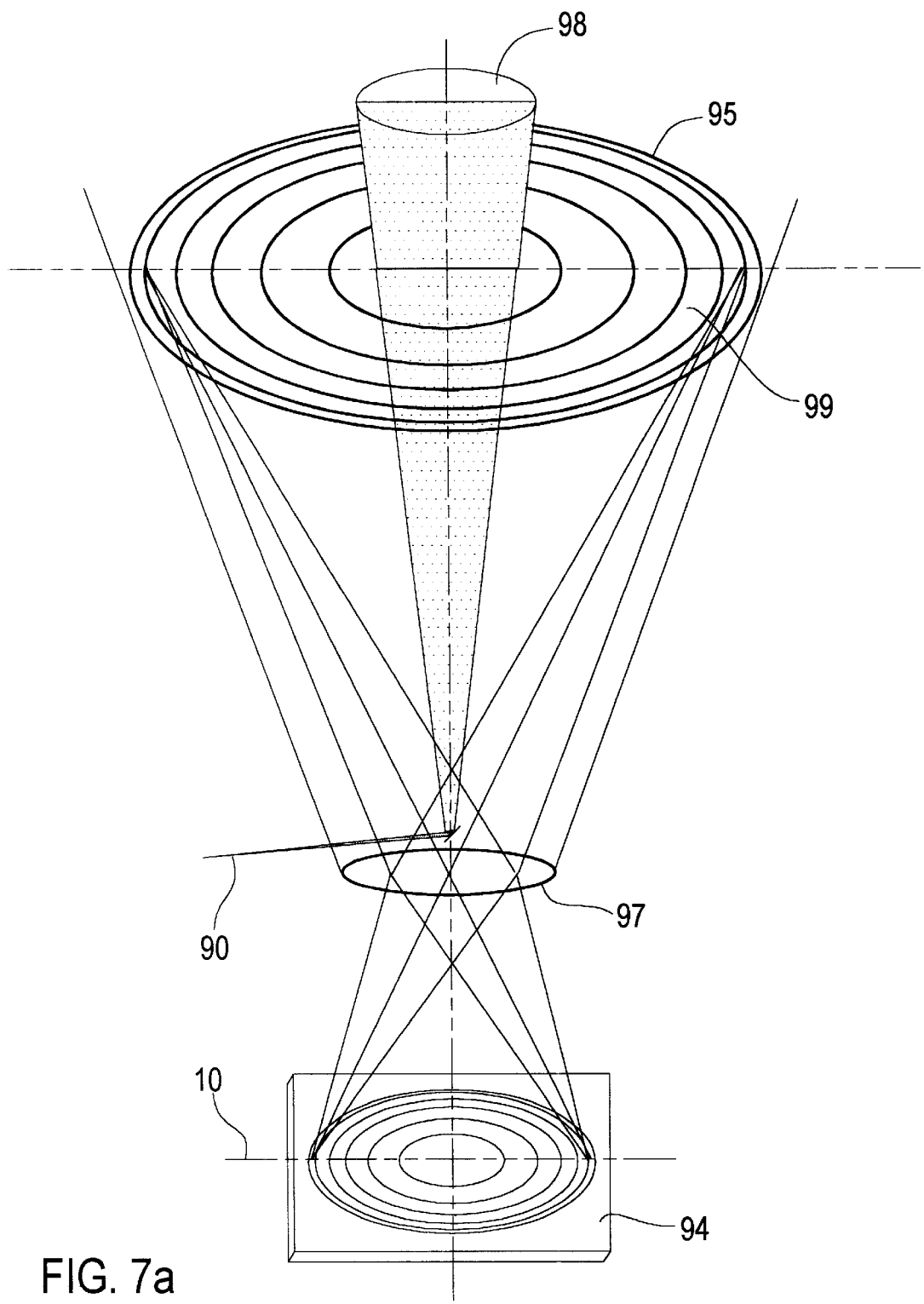
FIG. 7a shows a proposed embodiment of a multiple field-of-view lidar comprising the holographic optical element to study multiple scattering effects.

FIG. 7a shows an embodiment of a proposed multiple field-of-view lidar to study multiple scattering effects. Multiple scattering refers to photons scattered more than once before they are collected by the receiving telescope. Information about aerosols and cloud droplets can be inferred by measuring the intensity and angular distribution of multiple scattering.

Multiple scattering lidar systems have been built with multichannel photodetectors. The holographic system can be used to provide more efficient measurements with more fields of view. The holographic optical element and detectors can be implemented to image different angular regions down to single points. FIG. 7a shows that the innermost annulus (98) acts as a standard lidar receiver detecting single-scattered photons (along with some multiple-scattered photons) while the outer annuli, such as (99), view increasingly larger angles. The field of view (95) of the telescope (97) is effectively broken into concentric annuli corresponding to the annuli of the HOE. The number and sizes of annuli can be increased or decreased, and the angular width of each annulus is determined by the telescope and any additional optics. Using this method, multiple scattering can be measured as a function of zenith angle. This approach not only measures all angles simultaneously, but also provides an average measurement over an entire annulus of viewing area. The result would be a more representative and efficient measurement than can be obtained by the alternative method, which is to scan in steps over zenith angle.

Figure 7B:
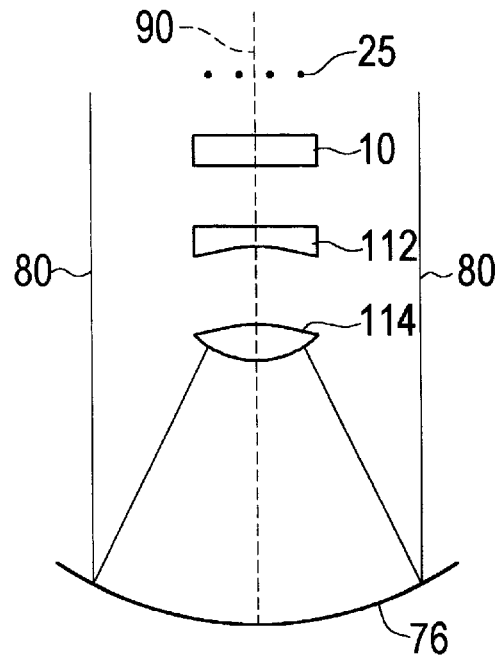
FIGS. 7b and 7c show different embodiments integrating the holographic optical element into receiving optics for a multiple field of view lidar.
Figure 7C:
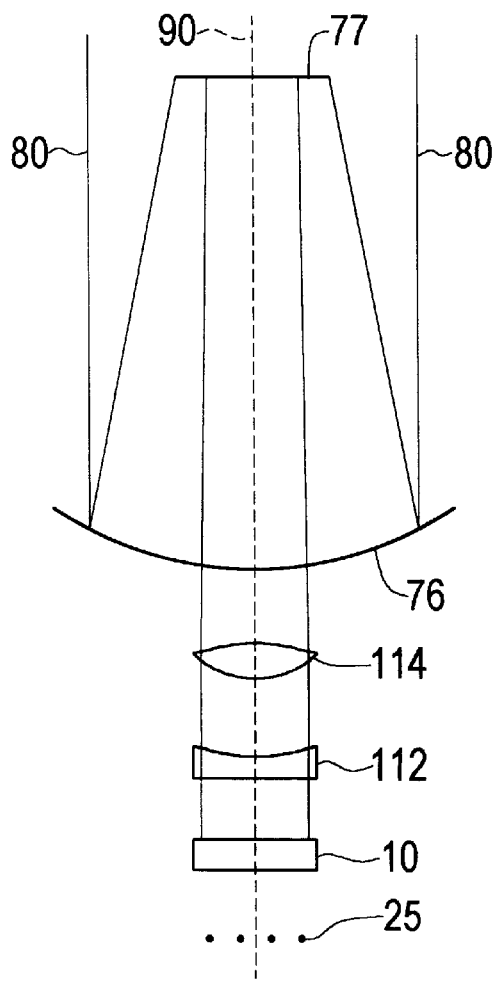

FIGS. 7b and 7c show different embodiments for the receiving optics of a multiple field of view lidar. As shown in the embodiments, a multiple field of view lidar does not necessitate high resolution spectral resolving elements such as Fabry-Perot interferometers or intricate computer controlled mirror arrangements such as the arrangement of mirrors 71 to 75 in FIG. 6a.

In the embodiment of FIG. 7b, light from the outgoing laser beam reference spectrum (90) and the return signal (80) are collected by wide angle telescope mirror 76, which in this embodiment has 6 degrees either way about the center axis for a 12 degree field of view. The light is then collimated through lenses (112 and 114) to be focussed on the HOE (10) which converts the light incident on each area to a point forming the series of points (25). A linear array detector may be optically coupled to the image points.

In an alternative embodiment of FIG. 7b, telescope mirror (76) focuses the light onto mirror (77) which in turn focuses the light through collimating lenses 112 and 114 onto the HOE (10).

FIG. 8 illustrates an embodiment of a holographic optical element that converts incident electromagnetic radiation of multiple wavelengths (102) to corresponding multiple sets of points (106 and 108). In this embodiment, a holographic optical element focuses intensity distributions of two different wavelengths into two corresponding series of points, each series of points forming its own line, the two lines lying in the same image or focal plane (14). The plate is constructed similarly as described in FIGS. 3a and 3b, but holographic emulsions for the different wavelengths are overlaid on each other, resulting in imaging of different wavelengths to different spatial locations. The number of wavelengths imaged, and the particular wavelength values that can be imaged are not limited in any way by the design of the holographic optical element. In this dual wavelength embodiment, a holographic plate focuses two lines of points, one line for an intensity distribution of wavelength 557.7 nm (106) and the other line for a distribution of wavelength 630.0 nm, (108) with the number of points adjusted to maximize the signal collection efficiency and minimize the signal-to-noise ratio at each wavelength. Incident radiation from a Fabry-Perot Interferometer may be coupled to the plate. Without a blocking filter to limit the spectral extent of the incident radiation, Fabry-Perot interferometers naturally pass multiple wavelengths, each wavelength producing a unique circular pattern. A multiple-wavelength holographic optical element can transform these unique circular patterns into spatially separated lines of points with each line mapping to a different wavelength. This can be envisioned as a two-dimensional array with points across the x-axis corresponding to the fringes of a given Fabry-Perot circular fringe pattern, and the lines distributed along the y-axis corresponding to different wavelengths. Blocking will be achieved with either a single dual-wavelength interference filter inserted before or after the interferometer or two single-wavelength interference filters inserted between the holographic element and a two-dimensional CCD array. Scanning the Fabry-Perot interferometer will produce spectral line profiles of the two wavelengths simultaneously. Following the phase difference between fluctuations of the two Doppler profiles, measurements of different parameters can be made. For example, a measure of gravity wave propagation between the two altitudes can be provided. As another example, measurement of the Doppler shifts would yield the horizontal wind velocities.

Many applications could use a holographic optical element that images different wavelengths to different spatial areas. In particular, one embodiment using such a holographic element would be an airglow instrument for passive wind measurements. Another would be a spectrometer.

Obviously, many modifications and variations of the present invention are possible in light of the above teachings. In particular, the number of annuli, size, radial pattern, number of wavelengths and wavelength can be varied to fit specific applications. It is therefore to be understood that within the scope of the appended claims the invention may be practiced otherwise than as specifically described.

What is claimed is:

1. An apparatus for resolving a spectral distribution comprising an optical plate with concentric areas sharing a common axis, each of said areas comprising a recording of a hologram created from a single wavelength, wherein incident spectral distribution focused on the areas is converted to image points, whose number is the same as the number of said areas, all the image points forming a straight line in a same focal plane with each of said image points being separated from other image points; and multiple detectors whose number is same as the number of said image points.

2. The apparatus of claim 1 wherein the said multiple detectors are solid state photodetectors.

3. The apparatus of claim 1 wherein the said multiple detectors are linear array detectors.

4. The apparatus of claim 1 wherein optical fibers optically couple the images to their corresponding detectors.

5. The apparatus of claim 1 wherein each area comprises additional recorded holograms for different wavelengths whereby the element focuses a spectral distribution of different wavelengths to a corresponding series of image points; each series being for each different wavelength and being separated from the other series.

6. The apparatus of claim 5 further comprising multiple detectors for detecting each series, wherein the number of said multiple detectors is same as the number of said image points.

7. The apparatus of claim 6 further comprising a Fabry-Perot interferometer having a fringe pattern that is focussed onto the plate optical.

8. The apparatus of claim 1 further comprising a laser transmitter creating an outgoing laser beam; outgoing optics that collect scattered light of the outgoing laser beam to create a zero wind reference spectrum; receiving optics for receiving the reference spectrum and a return signal of the outgoing laser beam that was backscattered; said receiving optics passing the reference spectrum and the return signal through a high resolution spectral resolving element; said resolving element creating a spectral distribution that is focused onto the optical plate, the plate focusing the distribution to image points which are optically coupled to multiple detectors whose number is same as the number of said image points so that a Doppler shift between the reference spectrum and the return signal is determined.

9. The apparatus of claim 8 wherein the high resolution spectral resolving element is a Fabry-Perot interferometer that creates a spectral distribution in the form of a circular fringe pattern; the areas of the plate optical are concentric equal areas sharing a common axis and wherein all the image points form a line and lie in a same focal plane.

10. The apparatus of claim 1 further comprising a telescope having a field of view broken into areas, through which an outgoing laser beam exits and through which a backscattered return signal returns, said return signal being focussed onto the optical plate, the areas of the plate being concentric; and multiple detectors optically coupled to the image points corresponding to the concentric areas, the concentric areas of the plate corresponding to the concentric areas of the field of view of the telescope.

11. A method of converting a spectral distribution of light to image points comprising the steps: (a) passing a spectral distribution through an optical plate comprising concentric areas, each of said areas recording hologram created from a single wavelength; (b) focussing the distribution incident on each of said areas to an image point separated from the image points of the other areas, wherein the image points form a straight line; and (c) detecting the image points with multiple detectors whose number is same as the number of the image points.

12. The method of claim 11 wherein said spectral distribution is a circular fringe pattern from a Fabry-Perot interferometer and wherein the areas of the plate are concentric equal areas sharing a common axis and the image points lie in the same focal plane.

* * * * *